2,782,125
CERAMIC BODIES

Charles E. Butler, Huntington, W. Va., assignor to McGraw Electric Company, Milwaukee, Wis., a corporation of Delaware No Drawing. Application April 29, 1953,
Serial No. 352,045

8 Claims. (Cl. 106—46)

This invention relates to electrical porcelain ceramic insulating materials, and particularly to those materials having improved electrical and mechanical properties, a lower firing temperature, a wide firing range, and a fast firing cycle.

The general theoretical body requirements for electrical porcelains should include: sufficient plastic ingredients to permit easy shaping and forming of the ware by the particular process used; sufficient non-plastic and/or inert ingredients to permit safe drying if conventional drying and firing methods are used; sufficient bonding ingredients to insure adequate strength to permit handling in the dry state and use in the fired state; and glass forming ingredients must be provided to produce the desired properties when fired to vitrification.

A standard porcelain mixture that would theoretically meet the requirements may be defined as follows:

1. Fifty percent clay consisting of equal parts of ball clay and china clay or kaolin, to contribute to the plasticity of the raw batch.
2. Twenty percent flint to contribute to body strength and to prevent cracking of the fired body.
3. Thirty percent feldspar or its equivalent, to provide fluxing materials which contribute to the glassy matrix binding together the fired body.

It is currently known that a properly fired porcelain body consists of approximately equal parts of free quartz ($SiO_2$) crystals and mullite ($3Al_2O_3 - 2SiO_2$) crystals bonded together by a glassy matrix. If the body is not properly fired, voids may be found in the glassy phase, and consequently, the porcelain will be porous in texture. Proper control of vitrification during firing is therefore essential. A reasonably wide firing temperature range (e. g. better than 20° F.) is desirable for production of porcelain materials to obtain satisfactory products using conventional methods of manufacture.

High dielectric breakdown strength (the voltage gradient measured in volts per mil) at which electrical breakdown occurs, is the principal electrical property desired.

It is therefore an object of the present invention to provide an electrical porcelain body which meets electrical and mechanical requirements, while increasing the firing range and lowering the minimum temperature for vitrification by the addition of a finely divided pre-formed fritted glass having a melting range of 1000–1300° F.

It is another object of this invention to provide an electrical procelain body having the addition of a finely divided, pre-formed fritted glass, wherein the relatively low temperature glass aids in promoting vitrification of the normally occurring glassy phase of the body, and which further aids in filling the pore spaces in the body, while cushioning the interstrains created within the body by incipient recrystallization during cooling.

It is a further object of this invention to provide an electrical porcelain body having improved electrical and mechanical properties, which body is non-porous, and which has a relatively wider firing range and a lower minimum firing temperature than conventional electrical porcelains, and which body is suitable for manufacture in accordance with known methods of forming and firing. In general, small percentages, that is, minor amounts of the glass frit are added, preferably from about 4% to about 20% by weight.

An increase in glass content of a ceramic body naturally increases translucency and is accompanied by poor forming, firing and mechanical properties, where, in addition, the clay content is held relatively low. Such bodies are generally suitable for ordinary casting or plastic forming, although good results have been obtained using the dry process of manufacture. One must assume that alumina from the clay goes into mullite formation. A decrease in quantity of intergrown mullite crystals is accompanied by a general loss in strength and impaired mechanical properties. This decreasing trend in the mullite quartz ratio is due to the lower capacity of feldspar glass for dissolving quartz as firing temperatures are reduced.

In high feldspar bodies at low firing temperatures, solution of mullite in the feldspar glass containing dissolved silica tends to compensate for the increase in quantity of solvent glass present. It is known that the glass content is increased where high firing temperatures are used as in European hard porcelains, or by the use of large quantities of glass-forming ingredients as in high feldspar Parian bodies, or by incorporation of a pre-melted glass into the body composition as in frit porcelains.

Accordingly, it has been found to be more effective to decrease the mullite-quartz ratio in a body than to increase the self-forming glass content of the body. I have further found that by adding a relatively small percent of a frit glass to the composition, the mullite-quartz ratio is decreased; in addition, the electrical properties are improved, and are accompanied by a general reduction in firing time and temperature.

In the past, additions of a glass frit to porcelain body compositions have often resulted in porous (0.5–25 percent porosity) bodies which require impregnation and additional firing to produce a state of non-porosity. These glass frits have contained a variety of ingredients, such as phosphates and/or lead, or fluorite ($CaF_2$). The present invention contemplates the use of a frit containing primarily $BaO$, $Na_2O$, $B_2O_3$, $ZnO$, and $SiO_2$. This frit contains no lead, phosphate, or fluorite, and in addition, a porcelain body containing the frit may be fired to vitrification, achieving a state of non-porosity in a single firing, as with a true porcelain.

The following examples are given to illustrate my invention:

|  | Ia | Ib | IIa | IIb | IIIa | IIIb |
|---|---|---|---|---|---|---|
| Feldspar | 47 | 45.6 | 48 | 46.1 | 54 | 51.9 |
| Clay | 39 | 37 | 32 | 30.7 | 32 | 30.7 |
| Silica | 14 | 13.4 | 20 | 19.2 | 14 | 13.4 |
| Frit Glass | 0 | 4 | 0 | 4 | 0 | 4 |
| Min. Firing Temp., °F | 2,240 | 2,160 | 2,280 | 2,160 | 2,200 | 2,160 |
| Av. Dielectric Strength, Volts/mil | 280 | 300 | 250 | 300 | 240 | 300 |
| Av. Impact Resistance, ft. lbs./sq. in | 1.6 | 3.0 | 1.6 | 2.0 | 1.8 | 2.0 |

The samples were prepared by mixing the designated ratio of raw materials with 10 percent water. The water contained a 2 percent solution of gum arabic as a binder. The samples were pressed in a one inch diameter mold to a thickness of approximately 0.1500 inch to 0.2000 inch, and were air dried while waiting their turn for firing, and later were fired at an average rate of 450° F. per hour.

The ratio of china clay to ball clay in all of the bodies was preferably kept at 2 or 3 to 1 to maintain a desirable plasticity in the unfired state, bearing in mind that it is the intent to provide an electrical porcelain, which ordinarily demands a relatively higher grade clay content. The above ratio of china clay and ball clay also permits excellent workability for pressing procedures. The ratio may be varied without departing from the scope of this invention to permit manufacture of electrical porcelain from a wet process slip.

The above examples list the raw materials in parts per hundred total, that is, percentage by weight.

Thus, it will be apparent that the ratios of the basic constituents of clay, feldspar and silica remain substantially identical in the comparative samples listed above, that is, the basic constituents are present in the same relative proportions in each pair of Examples I$a$ and I$b$, II$a$ and II$b$, and III$a$ and III$b$, respectively. The feldspars of cone 8–10 have proven to be very successful in contributing to the glassy phase. Silica of minus 200 mesh or finer of conventional quality for electrical porcelain manufacture was used in providing the above examples.

The following specific examples will indicate that a substantial increase in feldspar content does not contribute materially to the final properties, unless the body contains a small amount of the low temperature frit glass:

|  | IV | II$a$ | III$b$ |
| --- | --- | --- | --- |
| Cone 8 Keystone Spar | 35.0 | 48 | 46.1 |
| Minus 200 Mesh Silica | 25.0 | 20 | 19.2 |
| Ball Clay | 12.0 | 10 | 9.6 |
| China Clay | 28.0 | 22 | 21.1 |
| Frit Glass | 0 | 0 | 4.0 |
| Min. Firing Temperature, °F | 2,400 | 2,280 | 2,160 |
| Av. Dielectric Strength, Volts/Mil | 280 | 250 | 300 |
| Av. Impact Resistance, Ft. Lbs./Sq. In | 1.6 | 1.6 | 2.0 |
| Firing Range | 30° | 30° | 80° |

Cone 8 keystone spar is a feldspar having the following analysis:

| | Percent |
| --- | --- |
| Silicon dioxide ($SiO_2$) | 67.00 |
| Aluminum oxide ($Al_2O_3$) | 18.00 |
| Potassium oxide ($K_2O$) | 8.90 |
| Sodium oxide ($Na_2O$) | 4.60 |
| Calcium oxide (CaO) | 0.30 |
| Iron oxide ($Fe_2O_3$) | 0.08 |
| Loss on ignition | 1.12 |

As was stated above, the preferred frit glass contained primarily BaO, $Na_2O$, $B_2O_3$, ZnO, and $SiO_2$. This glass is manufactured under the disclosure of U. S. Patent No. 2,321,657, granted to A. E. Chester on June 15, 1943.

Although it is possible to vary the ingredients and obtain desirable results, a frit of the following analysis in terms of its oxides is deemed preferable:

| | Percent |
| --- | --- |
| Silicon dioxide ($SiO_2$) | 24.58 |
| Iron and aluminum oxide ($R_2O_3$) | 1.26 |
| Zinc oxide (ZnO) | 12.56 |
| Calcium oxide (CaO) | 0.25 |
| Barium oxide (BaO) | 32.91 |
| Magnesium oxide (MgO) | 0.20 |
| Sodium oxide ($Na_2O$) | 9.42 |
| Potassium oxide ($K_2O$) | 0.05 |
| Boric acid ($B_2O_3$) | 18.13 |
| Fluorine ($F_2$) | 1.34 |
| | 100.70 |
| $O_2$ equivalent of $F_2$ | −0.56 |
| | 100.14 |

I have further found that the addition of the small amount of the above-mentioned glass frit contributes favorably to the characteristics of steatite-base body compositions. Comparative examples of these are as follows:

| | V$a$ | V$b$ | VI$a$ | VI$b$ |
| --- | --- | --- | --- | --- |
| Talc | 60 | 57.6 | 60 | 57.6 |
| Feldspar | 35 | 33.6 | 20 | 19.2 |
| Clay | 5 | 4.8 | 20 | 19.2 |
| Glass Frit | 0 | 4.0 | 0 | 4.0 |
| Min. Firing Temp., °F | 2,270 | 2,050 | 2,270 | 2,120 |
| Dielectric Breakdown Strength in volts/mil | 250 | 305 | 275 | 275 |
| Impact Resistance in ft. lbs/sq. in | 2.5 | 3.4 | 2.1 | 3.1 |

I have found a range of body compositions, that when combined with the glass frit, will provide a fired ceramic body meeting established requirements for electrical apparatus porcelain to be as follows:

| Porcelain Base | | Steatite Base | |
| --- | --- | --- | --- |
| | Percent | | Percent |
| Clay | 32–45 | Clay | 13–20 |
| $SiO_2$ | 10–25 | Talc | 40–58 |
| Feldspar | 45–54 | Feldspar | 19–42 |

It will be apparent that a glass frit combined with the above-listed constituents will act favorably with other body compositions and be within the scope of this invention. The above body compositions, however, meet established standards. A method of selecting an optimum percentage of frit to be added has been fully described in the copending application by C. E. Butler and R. N. Hazelwood on April 30, 1953, Serial No. 352,104, and assigned to the same assignee as the present invention.

It will be apparent that there has been provided by the present invention a new ceramic body composition including an effective portion of a pre-formed fritted glass material, said body being capable of being fired to a state of non-porosity in one firing without additional impregnation and resulting in a product having improved electrical and mechanical properties, a lower firing temperature, a wider firing range and a faster firing cycle.

All numerical values set forth in the above specification and in the appended claims for the various materials are given in parts per hundred total, that is, in percentage by weight.

I claim:

1. A ceramic material consisting essentially of the reaction product of a mixture of from about 32% to about 45% clay, about 10% to about 25% silica, about 45% to about 54% feldspar, and from about 40% to about 20% by weight of a glass frit comprising as essential ingredients:

| | Approximate percentage of total weight of frit |
| --- | --- |
| Barium oxide | 33 |
| Sodium oxide | 9 |
| Boric oxide | 18 |
| Zinc oxide | 13 |
| Silicon dioxide | 25 |

2. A material according to claim 1 in which the clay constituent contains china and ball clay in a ratio of from 3/1 to 2/1 of china clay to ball clay.

3. A ceramic material consisting essentially of the reaction product of a mixture of about 37% clay, about 13% silica, about 46% feldspar and about 4% glass frit comprising as essential ingredients:

| | Approximate percentage of total weight of frit |
| --- | --- |
| Barium oxide | 33 |
| Sodium oxide | 9 |
| Boric oxide | 18 |
| Zinc oxide | 13 |
| Silicon dioxide | 25 |

4. A ceramic material consisting essentially of the reaction product of a mixture of about 31% clay, about 19% silica, about 46% feldspar and about 4% glass frit comprising as essential ingredients:

| | Approximate percentage of total weight of frit |
|---|---:|
| Barium oxide | 33 |
| Sodium oxide | 9 |
| Boric oxide | 18 |
| Zinc oxide | 13 |
| Silicon dioxide | 25 |

5. A ceramic material consisting essentially of the reaction product of a mixture of about 31% clay, about 13% silica, about 52% feldspar and about 4% glass frit comprising as essential ingredients:

| | Approximate percentage of total weight of frit |
|---|---:|
| Barium oxide | 33 |
| Sodium oxide | 9 |
| Boric oxide | 18 |
| Zinc oxide | 13 |
| Silicon dioxide | 25 |

6. A ceramic article consisting essentially of the reaction product of a mixture of about 5% clay, about 33% feldspar, about 58% talc and about 4% glass frit comprising as essential ingredients:

| | Approximate percentage of total weight of frit |
|---|---:|
| Barium oxide | 33 |
| Sodium oxide | 9 |
| Boric oxide | 18 |
| Zinc oxide | 13 |
| Silicon dioxide | 25 |

7. A ceramic article consisting essentially of the reaction product of a mixture of about 19% clay, about 19% feldspar, about 58% talc and about 4% glass frit comprising as essential ingredients:

| | Approximate percentage of total weight of frit |
|---|---:|
| Barium oxide | 33 |
| Sodium oxide | 9 |
| Boric oxide | 18 |
| Zinc oxide | 13 |
| Silicon dioxide | 25 |

8. A ceramic material consisting essentially of the reaction product of a mixture of from about 13% to about 20% clay, about 19% to about 42% feldspar and about 40% to about 58% talc, and from about 4 to 20% by weight of a glass frit comprising as essential ingredients:

| | Approximate percentage of total weight of frit |
|---|---:|
| Barium oxide | 33 |
| Sodium oxide | 9 |
| Boric oxide | 18 |
| Zinc oxide | 13 |
| Silicon dioxide | 25 |

References Cited in the file of this patent
UNITED STATES PATENTS

| 1,120,951 | Locke | Dec. 15, 1914 |
| 1,127,042 | Locke | Feb. 2, 1915 |
| 1,631,695 | Riddle | June 7, 1927 |
| 1,642,754 | Singer | Sept. 20, 1927 |
| 1,682,250 | Riddle | Aug. 28, 1928 |
| 2,135,915 | Schonbeck et al. | Nov. 8, 1938 |
| 2,321,657 | Chester | June 15, 1943 |